Aug. 16, 1955     K. N. THOMPSON     2,715,610
PROPORTIONER FOR CHEMICAL FEED
Filed Feb. 29, 1952     2 Sheets-Sheet 1

INVENTOR.
KEVIN N. THOMPSON
BY
HIS ATTORNEYS.

United States Patent Office 2,715,610
Patented Aug. 16, 1955

2,715,610

PROPORTIONER FOR CHEMICAL FEED

Kevin N. Thompson, Lakewood, Ohio, assignor to The Standard Oil Company, Cleveland, Ohio, a corporation of Ohio Application February 29, 1952, Serial No. 274,117

9 Claims. (Cl. 210—17)

This invention relates to flow apportioning systems, and more particularly to apportioning systems adaptable to such industrial uses as water softening units and like systems in which it is required to regulate and apportion a flow of chemicals for treating water and the like.

In a currently used industrial water softening system, the water treating chemicals are first mixed in an aqueous slurry in a dilution tank, from which the slurry is fed to one or more softener tanks to be mixed proportionally with raw water. The slurry is usually circulated at a relatively high velocity to keep the chemicals from settling out. From this circulatory stream of the slurry, portions of the slurry are drawn off to be added to raw water through a proportioning device or valve under the control of the raw water feed. The difficulty or disadvantage of this system is that the slurry tends to clog and vary the action of the proportioning valve, thereby changing the ratio of the chemicals to the raw water.

It is an object of this invention to provide a system for accurately and economically apportioning the flow of reagents to a plurality of tanks for reaction therein.

It is a further object of this invention to provide an apportioning system for supplying slurries to liquids in a plurality of reaction chambers of any desired size, or of different sizes.

A further object of the invention is to provide a system for supplying slurries or solutions of reagents to water softening systems in which the proportions of concentrations of the solutions or slurries are varied in proportion to the volume of raw water to be treated to maintain a constant relation between them.

A typical water softening system embodying the present invention is more fully described in the following specification, and in the accompanying drawings, in which.

Figure 1:
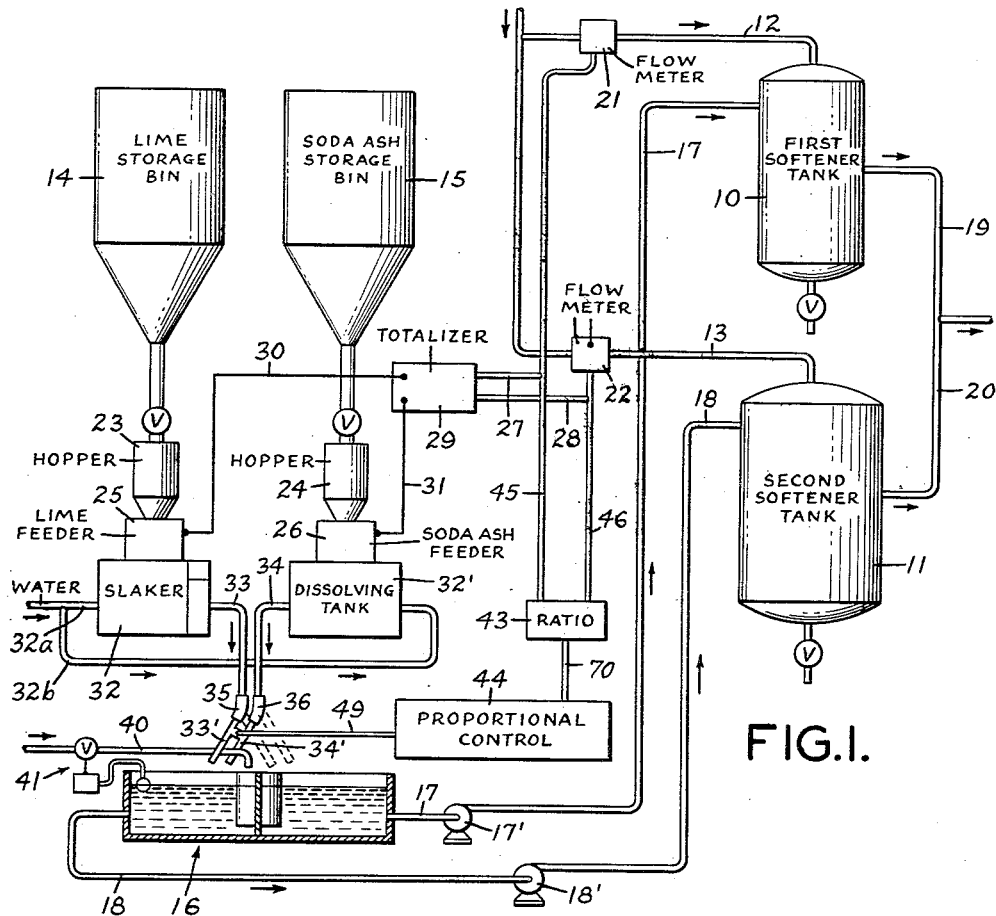
Fig. 1 is a flow diagram of a water softening system incorporating one embodiment of the invention.

Referring to the flow diagram of Fig. 1, the system includes first and second water softener tanks 10 and 11 connected to receive a flow of raw feed water through inlet pipe lines 12 and 13 respectively, the two tanks 10 and 11 operating in parallel to provide increased quantities of softened or treated water.

Water treating chemicals, having their origin in storage bins 14 and 15 and made into aqueous slurries in slaker 32 and dissolving tank 32', are passed to a dilution tank 16 from which they are pumped into the softener tanks 10 and 11 through inlet lines 17 and 18 respectively. Treated water is then drawn off as required from the softener tanks through outlet pipe lines 19 and 20.

The invention, as embodied in the illustrated system, is concerned with means for providing the necessary proportions of lime and soda ash for the treatment of raw water in both softener tanks, wherein the total quantity of raw water flowing into the tanks may vary over a wide range, as may the relative amounts of raw water accommodated by each tank. The system also contemplates the use of single sources of each of the several water treating chemicals, irrespective of the number of softener tanks used. Thus, softener tanks may be added to expand the capacity of an existing system set up according to the invention without the necessity of increasing the number of storage bins.

Flow meters 21 and 22 are provided in the raw water inlet lines 12 and 13 respectively, to provide control signals indicative of the volume or weight of raw water passed into the softener tanks 10 and 11. These signals, which may be either electric, pneumatic, or of any other preferred type, are utilized in a manner hereinafter described both for governing the total quantity of lime and soda ash injected into the system over a given period of operation and for apportioning these chemicals between the softener tanks according to the quantity of raw water accommodated by each.

The storage bins 14 and 15 provide sources of unslaked lime and dry soda ash respectively. Both the lime and soda ash are dropped from the bins into corresponding hoppers 23 and 24, the lime from the hopper 23 being fed to the slaker 32 by a feeder 25 and the soda ash from the hopper 24 being fed to the dissolving tank 32' by a feeder 26.

The flow meters 21 and 22 are connected by means of conduits 27 and 28 respectively, to a conventional totalizer unit 29 which, through conduits or linkages 30 and 31, controls the total output of lime and soda ash from the feeders 25 and 26. The totalizer integrates the signals received from the flow meters and provides a control output signal or action for each preestablished total number of input signals received from the flow meters. The totalizer may be of a conventional type having, for example, a stepping switch for closing a circuit after each revolution or a predetermined fraction of a revolution.

In operation each flow meter provides, for example, one pulse for each gallon of raw feed water passed therethrough, and the totalizer is set to close a circuit to actuate the feeders upon receipt of say 100 pulses. The quantities of lime and soda ash provided by the feeders upon each actuation are accordingly preestablished to treat 100 gallons of raw water. An adjustable trap chamber type of feeder may be used or an automatic weighing device of known type.

As stated, dry lime from the feeder 25 is passed to a lime slaker unit 32, from which it is passed into a discharge conduit 33. The soda ash feeder 26 discharges into the dissolving tank 32', thence into a conduit 34. Water is injected into the slaker 32 and dissolving tank 32' by means of inlet pipes 32a and 32b, respectively, the flow of water being in sufficient quantities to afford a continuous flow in the output conduits 33 and 34. The conduits 33 and 34 terminate in discharge members 33' and 34' respectively, which are suspended by means of flexible couplings 35 and 36 above the dilution tank 16. The discharge members may be nozzles or simply open end pipes, the latter being preferred. The flexible couplings, which may be sections of rubber hose for example, permit the nozzles to be swung to discharge into different areas of the dilution tank 16 in a manner to be described.

Figure 2:
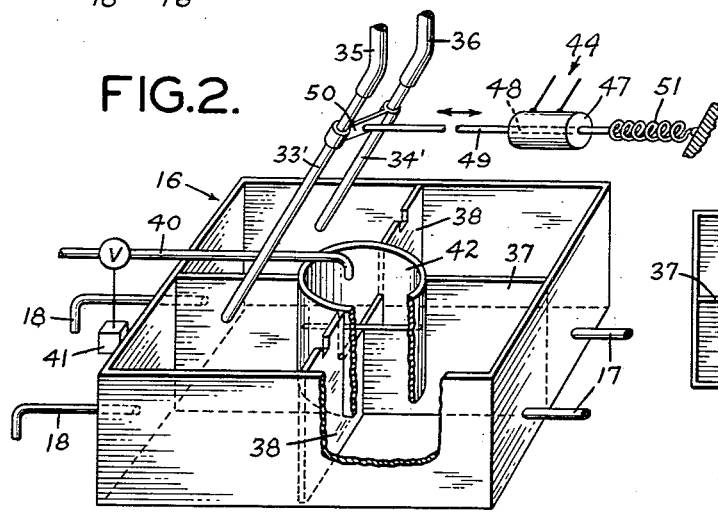
Fig. 2 is a perspective view of a portion of the system including the dilution tank.
Figure 3:
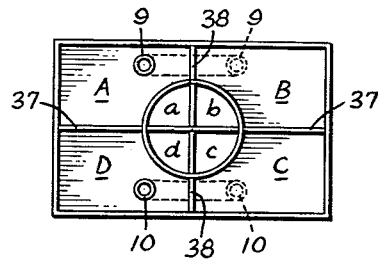
Fig. 3 is a top view of the dilution tank shown in Fig. 2.

As best seen in Figs. 2 and 3, the quadralateral dilution tank 16 is divided into four primary compartments A, B, C and D by means of transverse partitions 37 and 38. The compartments separate the respective soda ash and lime slurries, thereby precluding the formation of insoluble calcium carbonate in the system. The discharge member 33', which discharges a slurry of slaked lime, is adapted to be displaced to discharge selectively into compartments D and C, while the discharge member 34' is adapted to be directed for discharging selectively into compartments A and B.

Additional dilution water for making up the required volume of aqueous slurries or solutions of soda ash and slaked lime is injected into the dilution tank through a common inlet pipe 40 having float controlled valve 41 to maintain a constant liquid level within the tank. The constant liquid level maintained within the tank permits the total volume of chemical solution pumped to be held constant even though its strength may be varied to suit treating requirements.

The inlet pipe 40 discharges into a central area in the dilution tank formed by cylindrical wall 42 which communicates with the compartments A, B, C and D. The inner ends of the partitions 37 and 38 are cut away and extend only partially along the length of the wall 42 to form inner compartments a, b, c and d within the cylindrical wall corresponding to large compartments A, B, C and D. The cylindrical wall 42 extends upwardly to about the tops of the partitions 37 and 38 and downwardly to a point spaced from the bottom thereof, thereby to provide openings joining each of the small compartments a, b, c and d with corresponding large compartments A, B, C and D.

The two chemical conduits 17, leading to the softener tank 10, are connected to the lime and soda ash slurry compartments B and C; and the conduits 18, leading to the softener tank 11, are connected to the lime and soda ash slurry compartments A and D.

Chemical feed pumps 17' and 18' in the lines 17 and 18 insure a continuous, constant-volume flow of the slurries from the several compartments of the dilution tank to the softener tanks. The concentration of the slurries is, however, varied according to the quantity of raw water entering the softener tanks.

In order that each individual softener tank may receive lime and soda ash solutions in amounts suitable for treating the raw water fed thereto, an apportioning system is provided to divide the flow of soda ash and slaked lime solutions from the feeders into the various dilution tank compartments.

It will be recalled that fixed quantities of lime and soda ash from the bins are passed at controlled intervals to the slaking and dissolving tanks and then as slurries or solutions to the discharge members 33' and 34' through the action of the totalizer 29 in accordance with the rate of flow of the raw water.

The members 33' and 34' are adapted to discharge continuous chemical streams containing fixed quantities of lime and soda ash, into the dilution tank 16. Apportionment of the lime and soda ash among the desired compartments of the dilution tank is accomplished by means of a timing system based upon a fixed time interval required for the discharge of the fixed quantities of lime and soda ash. It will be understood that the quantities of lime and soda ash solutions discharged are made large enough so that during the proportioning cycle a continuous stream flows through the discharge elements.

The apportioning system accordingly comprises the ratio timing device 43 and a proportional controller 44, the latter of which controls the displacement of the members over the dilution tank compartments.

The ratio timing device 43 which governs the operation of the proportional controller 44 is adapted to receive impulses or signals from the respective flow meters 21 and 22 through conduits 45 and 46. The signals received are stored as a ratio indicative of the proportion of the total flow of raw water which each softener tank receives. This volumetric ratio is then transformed into a time ratio based upon the time required for the members to discharge the fixed quantities of lime and soda ash into the dilution tank.

Thus, if the time interval of the nozzle discharge is preestablished at one minute, and if 100 gallons of raw water (as selected for purposes of illustration) is divided 60 gallons to the first softener tank and 40 gallons to the second softener tank the proportional controller will direct the discharge from the members for 36 seconds into tank compartments B and C (corresponding to the first softener tank) and for 24 seconds into compartments A and B (corresponding to the second softener tank).

The proportional controller 44 comprises means for positioning the discharge members 33', 34' over the appropriate compartments of the dilution tank and may comprise, for example, a solenoid device 47, the armature 48 of which is linked by means of a connecting rod 49 to a yoke member 50 secured to the discharge members 33' and 34' at a point beneath the flexible couplings 35 and 36. The travel of the solenoid armature 48 is such that its extreme positions dispose the discharge members to discharge into appropriate compartments of the dilution tank 16. The solenoid armature 48 is biased by a return spring 51 to one of its extremes and is urged to its other extreme by the energization of the solenoid device from a source of electrical energy 52 through a control circuit to be described below.

The ratio device is accordingly adapted to energize and deenergize the solenoid device so that the discharge members 33' and 34' discharge into the appropriate dilution tank compartments for periods of time which bear a relationship to the total time required by the members to discharge the fixed quantity of chemicals (one minute in the selected example) which is a function of, or directly proportional to the relationship between the raw water received by the corresponding softener tanks and the total flow of raw water received by both softener tanks.

Figure 4:
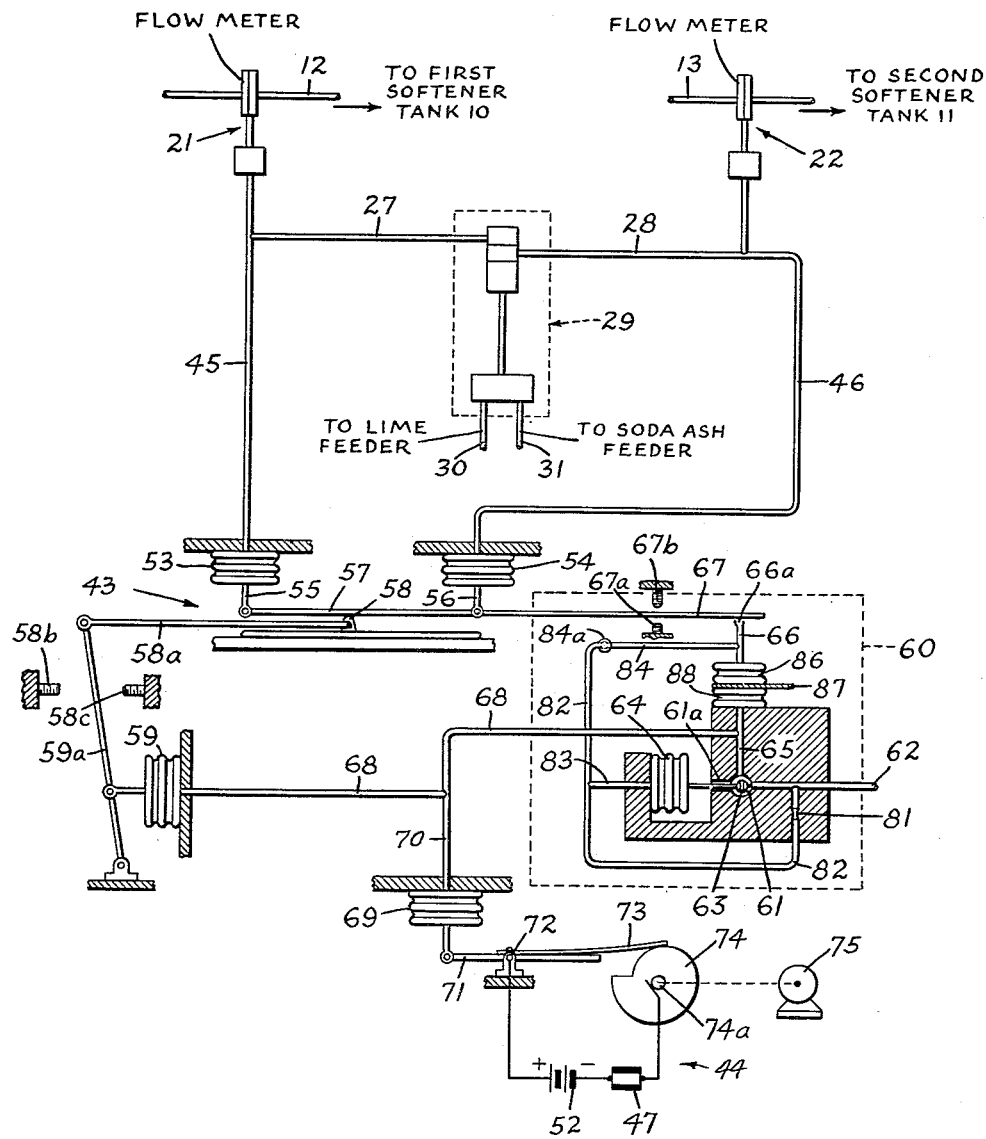
Fig. 4 is a schematic diagram of the control system.

The control system including the ratio timing device 43 is illustrated diagrammatically in Fig. 4. It will be seen that the flow meters 21 and 22 in the respective inlet pipes 12 and 13 are connected by means of the conduits 27 and 28, respectively, to the totalizer 29, which in turn operates the feeders 25 and 26 for lime and soda ash through the respective conduits 30 and 31. The flow meters are also connected by means of conduits 45 and 46 to the ratio timing device 43.

The ratio timing device 43 includes two bellows 53 and 54, respectively, connected to receive impulses from the flow meters 21 and 22, respectively, each impulse appearing in the form of air pressure pulses whose magnitude is representative of the magnitude of the flow through each flow meter.

The moving or free ends of the bellows 53 and 54 are mechanically connected by links 55 and 56, respectively, to opposite ends of a balance arm 57 which pivots on movable fulcrum 58. The lateral position of the fulcrum 58 when the balance arm 57 is in balance, is a function of the ratio of impulse pressures received by the bellows 53 and 54. To this end, the position of the fulcrum 58 is controlled by a third bellows 59 actuated through an air relay device 60, the operation of which is governed by the balance arm 57. A suitable driving linkage, such as a slide link 58a joined to the free end of a rock arm 59a may be provided to connect tthe bellows 59 to the shiftable fulcrum 58. Preferably adjustable stops 58b and 58c are disposed in the path of movement of the rock arm 59a in order to confine the travel of the movable fulcrum 58 to operation within preestablished limits.

The air relay device 60 includes an air duct 62 connecting a suitable source of air pressure (not shown) to a valve chamber 61. The valve chamber 61 is provided with a vent 61a through which a diamond-shaped valve 63, disposed within the chamber 61, is operated by means of a bellows 64. The valve 63 is adapted to selectively control either the vent 61a or the input air line 62.

Connected to the chamber 61 by means of a conduit 65 is a bellows 88 surmounted by a rigid, impermeable diaphragm 87 and a second bellows 86. The bellows 86 is vented by a conduit 66 which terminates in an orifice 66a at its upper end. Overhanging the orifice 66a is a spring bar or arm 67 which is carried by the balance arm 57. The conduit 66 also is connected to the input conduit 62 by means of a conduit 84, a flexible coupling 84a and a conduit 82, the latter having a constricting orifice 81. The conduit 82 communicates with the bellows 64 by means of a conduit 83 and the air chamber 61 is placed in communication with the third bellows 59 by means of a conduit 68. The travel of the arm 67 is limited by stops 67a and 67b, the spacing of which may be on the order of 0.01 inch. The distances between the nozzle 66a and the arm 67 will vary about median values on the order of 0.01 inch to establish a variable valve action.

A fourth or timer controlling bellows 69 is connected by means of a conduit 70 and the conduit 68 to the air chamber 61. The timer bellows 69 is connected to a rock arm 71 pivoted on a fulcrum 72. The arm 71 carries an electrically conducting, flexible contact arm 73 which is adapted to engage the edge surface of a snail cam 74, the latter being rotated by a motor 75 at a uniform, low speed, such as one R. P. M., for example. The contact arm 73 is movable with the rock arm 71 so that it may be made to engage the snail cam for any portion of each rotation thereof from zero to 100 per cent. The snail cam is thus operated as a switch in a series electrical circuit including the snail cam 74, a slip ring connection 74a, the solenoid device 47, the source of electrical energy 52, and the contact arm 73.

In operation, assuming the bellows 54 expands by virtue of an increased number of signals from the flow meter 22, the balance arm 57 carrying the spring bar 67 will swing downwardly toward the nozzle 66a. This restricts the flow of air through the nozzle 66a, thereby resulting in an increased pressure in the conduit 82 which causes the bellows 64 to expand. Expansion of the bellows 64 carries the valve 63 to the right, as viewed in the figure, away from the vent 61a and toward the conduit 62. Due to increased action of the vent 61a and a decrease of the air supply from the conduit 62, air pressure will be relieved from the conduits 68 and 65. This results in the contraction of the bellows 59 and 69, resulting in movement of the fulcrum 58 to the right, as viewed in the figure, and movement of the contact arm 73 downwardly. The system is thus brought into balance for values corresponding to the new flow rate.

As the air pressure in the conduit 66 rises, the bellows 86 will expand, whereas the decrease in air pressure in the conduit 65 will cause the bellows 88 to contract due to the action of the valve 63. The bellows 86 and 88 are so constructed that in the circumstances described above, the nozzle 66a will be moved downwardly for a slight distance, thereby avoiding hunting movement of the spring bar 67.

As a result, the solenoid 47 will be energized for a greater part of the time during each rotation of the snail cam 74 so that the discharge members 33' and 34' will discharge into the tanks B and C for a longer time or greater proportion of each cycle. Since it is from these tanks that the second stationary tank 11 derives its charges of treating chemicals, it will be understood that proper proportions of treating chemicals will be provided to the second tank during this interval of increased capacity.

A system is thus provided wherein slurries of varying strength or concentration are proportioned to the dilution tank compartments, which slurries are pumped directly from the dilution tank to the softener tanks without passing through complex proportioning valves susceptible to clogging. The flow of slurry from the dilution tank to the softener tanks is maintained at a constant volume by the pumps 17' and 18', while the concentration of the slurry is varied according to the quantities of raw water flowing into the respective softener tanks. Since a constant, high rate of flow of the slurry is maintained, settling or sedimentation is prevented.

It will be understood that the number of softener tanks need not be limited to two, and that the system is not necessarily limited to operation in a water-softening system, as selected for purposes of illustration. It should also be understood that any variations in the specific components of the system may be provided within the scope of the invention, which should consequently be defined by the following claims.

I claim:

1. In a system for combining materials, means supplying simultaneously a plurality of quantities of a first material, means for measuring each quantity, a single source of a second material, means responsive to a given total quantity of first material for supplying a predetermined quantity of the second material from the source, means for discharging said quantity of second material at a given rate and in a given time interval, and means responsive to said measuring means for directing the discharge of said second material selectively into the respective quantities of first material, the time of discharge into each quantity of first material being a function of the ratio between that quantity and the total quantity of first material.

2. In combination, means supplying simultaneously a plurality of quantities of a first material, means for measuring the individual quantities of first material for providing signals representative thereof, a single source of a second material, totalizing means responsive to said signals for supplying a given quantity of said second material from the source, means for discharging said quantity of second material at a given rate, and control means responsive to said signals for discharging the second material selectively into the respective quantities of first material for time intervals which are functions of the corresponding quantities of first material relative to the total quantity of first material.

3. In an apportioning system the combination of means supplying simultaneously a plurality of subquantities of a first material, means supplying a given amount of second material and means for apportioning the given quantity of said second material into a plurality of subquantities each corresponding to a subquantity of said first material, each apportioned subquantity of said second material bearing a relationship to the total quantity thereof which is a function of the relationship of the corresponding subquantity of said first material and the total quantity of first material, said apportioning system including single means for discharging said given quantity of said second material at a uniform rate and in a given total time interval, a plurality of receptacle means into which said second material is selectively discharged, said plurality of receptacles corresponding in number to the number of subquantities of said first material, means for selectively directing the discharge of said second material into each of said receptacles for a time interval bearing a relationship to the given total time interval of discharge of said second material which is a function of the relationship between corresponding subquantities of the said first material and the total quantity of said first material.

4. In an apportioning system, the combination of means for supplying simultaneously a plurality of quantities of a first material, means for measuring said quantities of said first material and for providing signals representative of each quantity, means responsive to the said signals as representing the total quantity of said first material for supplying a preestablished quantity of second material, and means for apportioning said quantity of said second material into a plurality of subquantities each proportioned to a quantity of said first material, each proportioned subquantity of second material bearing a relationship to the total quantity thereof which is a function of the relationship between the corresponding quantity of said first material and the total quantities of the first material, said proportioning means including a plurality of receptacles corresponding in number to the number of said quantities of first material, single means for discharging said given quantity of said material at a uniform rate and in a given time interval, said discharging means being adapted to discharge selectively into any one of said receptacles, and means responsive to said signals for selectively directing the discharge of said second material into each receptacle for a period of time bearing a relationship to the total given time of discharge of said second material which is a function of the relationship of the corresponding quantity of first material to the total quantity of first material.

5. In a system for apportioning materials, a source of first material and means for establishing a plurality of flows thereof, a plurality of receptacles numbering at least one for each flow of first material, metering means for measuring the flows of said first material and for providing signals representing quantity of the flows, means responsive to said signals for providing a given quantity of a second material, means for discharging said given quantity in a given time interval, said means being constructed and arranged to discharge the flow selectively into any one of the receptacles, means responsive to said signals for controlling the time which said second material is discharged into each receptacle, and means for conveying the second material from said receptacle to be mixed with the material of corresponding flows.

6. An anti-clogging system for mixing materials in preestablished proportions comprising at least two mixing tanks for accommodating a flow of materials, means for establishing a flow of first and second materials to be mixed within said system, a plurality of intermediate tanks for initially receiving the second of said materials, said intermediate tanks numbering at least one for each of said mixing tanks, material conveying means joining each of said mixing tanks with a corresponding intermediate tank, means for feeding the first of said materials into both of said mixing tanks, metering means for measuring the flow of said first material into both of the mixing tanks and for developing signals representing the flow, means responsive to the sum of said signals for providing a given quantity of said second material, means for discharging the given quantity of said second material into said intermediate tanks in a given time interval, said means including an orifice displaceable to selectively discharge its full flow into any one of said intermediate tanks, and timing means responsive to the said signals for governing the time that the flow of the second material is directed into each of the intermediate tanks, the time being proportional of the flow of the first material into that mixing tank which is joined to the particular intermediate tank, and means for establishing the flow of the second material from the intermediate tanks to their corresponding mixing tanks for proportional mixing with said first material.

7. An anti-clogging water softening system comprising at least two softener tanks for receiving raw water and charges of diluted softening chemicals, a plurality of dilution tanks numbering at least one for each softener tank, metering means for measuring the flow of raw water into each of said softener tanks for providing signals representative of the flow, a source of water treating chemicals and means for establishing the flow thereof, means responsive to said signals for providing a given quantity of said water treating chemicals, means for discharging said chemicals into the dilution tanks at a given rate, said discharging means including orifice means operable to selectively discharge into any one of said dilution tanks, and timing means responsive to said signals for timing and directing the discharge of chemicals into each of said dilution tanks, the time of discharge into any given dilution tank being proportional to the flow of raw water into that softener tank which is connected to the given dilution tank, means for diluting the chemicals in the dilution tank to form a slurry, and means for conveying the slurry from each dilution tank into the corresponding softener tank.

8. A system as set forth in claim 2, said first material including first and second quantities, a balance arm, a shiftable fulcrum for the balance arm, first and second means respectively responsive to the signals representing the first and second quantities of first material for loading the balance arm on opposite sides of said fulcrum, driving means for shifting the fulcrum, means controlled by said balance arm for operating said driving means and for operating said means for discharging the second material selectively into the quantities of first material.

9. A system as set forth in claim 8, said means for discharging the second material comprising discharge means movable between two positions for selectively discharging the second material into the quantities of first material, electromagnetic means for moving the discharge means between its two positions, switch means for energizing said electromagnetic means during a portion of the time interval required for the discharge of said second material, said switch means comprising a cam having a radially varying surface rotated as a function of the total time required for the discharge of the second material, a follower for the cam movable under the control of said balance arm to control the period of its engagement with the cam during each cam cycle.

References Cited in the file of this patent

UNITED STATES PATENTS

| | | |
|---|---|---|
| 401,458 | Powers | Apr. 16, 1889 |
| 657,146 | Williamson | Sept. 4, 1900 |
| 1,262,730 | Yoder | Apr. 16, 1918 |
| 1,296,150 | Wright | Mar. 4, 1919 |
| 1,388,613 | Simsohn | Aug. 23, 1921 |
| 2,024,478 | Short | Dec. 17, 1935 |
| 2,459,700 | Harper | Jan. 18, 1949 |
| 2,570,275 | Pritchard | Oct. 9, 1951 |